United States Patent
Seidl et al.

(10) Patent No.: US 11,888,105 B2
(45) Date of Patent: Jan. 30, 2024

(54) METHOD AND SYSTEM FOR THERMALLY CONNECTING A HEAT SOURCE OF A BATTERY SYSTEM TO A HEAT SINK OF A BATTERY SYSTEM

(71) Applicant: Lisa Draexlmaier GmbH, Vilsbiburg (DE)

(72) Inventors: Stefan Seidl, Landshut (DE); Alexander Hahn, Roettenbach (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 336 days.

(21) Appl. No.: 17/387,451

(22) Filed: Jul. 28, 2021

(65) Prior Publication Data
US 2021/0359334 A1 Nov. 18, 2021

Related U.S. Application Data

(63) Continuation of application No. PCT/EP2020/051485, filed on Jan. 22, 2020.

(30) Foreign Application Priority Data

Jan. 28, 2019 (DE) .......................... 102019102003.4

(51) Int. Cl.
*H01M 10/04* (2006.01)
*H01M 10/613* (2014.01)
(Continued)

(52) U.S. Cl.
CPC ....... *H01M 10/0404* (2013.01); *H01M 10/48* (2013.01); *H01M 10/613* (2015.04);
(Continued)

(58) Field of Classification Search
CPC ............. H01M 10/0404; H01M 10/48; H01M 10/613; H01M 10/653; H01M 10/6554
See application file for complete search history.

(56) References Cited

FOREIGN PATENT DOCUMENTS

DE 941322 4/1956
DE 102008059961 6/2010
(Continued)

OTHER PUBLICATIONS

International Search Report for International Application PCT/EP2020/051485, dated Apr. 20, 2020.

*Primary Examiner* — Daniel McNally
(74) *Attorney, Agent, or Firm* — Burris Law, PLLC

(57) ABSTRACT

A method and system for thermal connection of a heat source of a battery system to a heat sink of the battery system are provided. The method includes implementing of a placing process using a placing device, wherein a distance between an electrically conducting housing surface of the heat source and an electrically conducting heat-transmission surface that is part of the heat sink or is adjacent to it, is reduced by compression of an electrically insulating heat-conducting material. The method also includes implementing of a continuous measurement of capacitance between the housing surface and the heat-transmission surface during the placing process using a measuring device. Additionally, the method includes monitoring of a layer thickness of the heat-conducting material and controlling of the placing device using a control device until a prescribed layer thickness of the heat-conducting material is attained based on the capacitance measurement.

10 Claims, 1 Drawing Sheet

(51) Int. Cl.
*H01M 10/653* (2014.01)
*H01M 10/6554* (2014.01)
*H01M 10/48* (2006.01)
*H01M 50/202* (2021.01)

(52) U.S. Cl.
CPC ..... *H01M 10/653* (2015.04); *H01M 10/6554* (2015.04); *H01M 50/202* (2021.01)

(56) References Cited

FOREIGN PATENT DOCUMENTS

| | | | | |
|---|---|---|---|---|
| DE | 102013220690 | 4/2015 | | |
| DE | 102017116420 | 1/2018 | | |
| DE | 102017223664 | 6/2019 | | |
| DE | 102017223664 A1 * | 6/2019 | .......... | H01M 10/658 |
| WO | 2016167873 | 10/2016 | | |

* cited by examiner

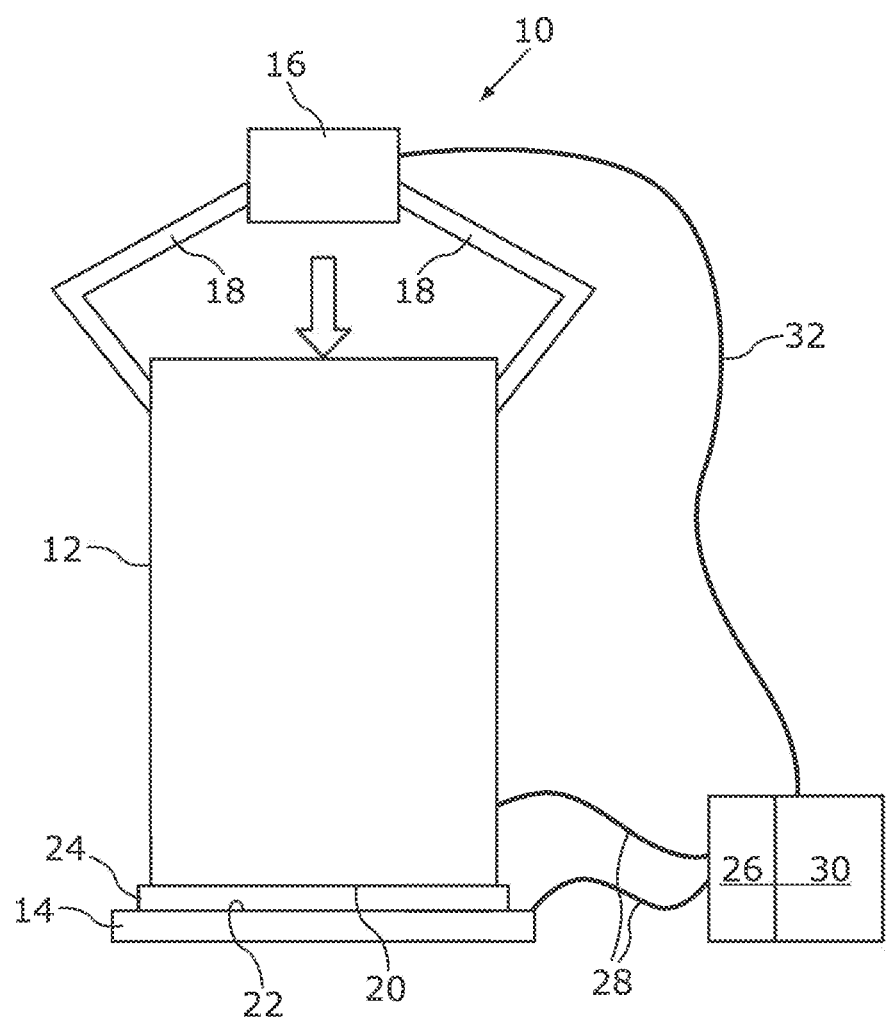

METHOD AND SYSTEM FOR THERMALLY CONNECTING A HEAT SOURCE OF A BATTERY SYSTEM TO A HEAT SINK OF A BATTERY SYSTEM

CROSS-REFERENCE TO RELATED APPLICATIONS

This application is a continuation of International Application No. PCT/EP2020/051485, filed on Jan. 22, 2020, which claims priority to and the benefit of DE 102019102003.4, filed on Jan. 28, 2019. The disclosures of the above applications are incorporated herein by reference.

FIELD

The present disclosure relates to a method and a system for thermal connection of a heat source of a battery system to a heat sink of a battery system.

BACKGROUND

The statements in this section merely provide background information related to the present disclosure and may not constitute prior art.

In battery systems, there are usually a plurality of heat sources, such as, for example, battery cells, battery modules connected to battery cells, current-carrying components, such as, for example, fuses, bus-bars, relays, and the like. In particular, in powerful battery systems it is therefore common and required to provide heat sinks, e.g., in the form of liquid-flow cooling systems or the like, in order to dissipate excess heat away from such heat sources.

It is known per se, for example, to provide thermal interfaces for thermal connection of battery cells to cooling surfaces. Such thermal interfaces are usually formed by heat-conducting materials in the form of so-called gap fillers or thermal interface materials, or also heat-conducting adhesives. Such heat-conducting materials for thermal connection of battery cells to cooling surfaces usually require a defined layer thickness.

The thermal resistance of such a layer made of a heat-conducting material and a cooling power achievable thereby are usually only influenceable by the layer thickness of the respective heat-conducting material in a battery system with given material and given surfaces. In particular with the use of a plurality of battery cells in a battery system, it is usually desirable to achieve a targeted and above all uniform temperature distribution in the battery system, in particular with respect to the battery cells. This is because the rate of aging of battery systems can be influenced in a particularly positive manner by small temperature differences between the individual battery cells.

However, such heat-conducting materials must also not be too thin, because an electrical insulation effect must usually also be realized and ensured as a rule by the heat-conducting material, in particular with the thermal connection of current-conducting components and battery cells.

In the manufacture and installation of such battery systems, we have discovered that the most diverse components, such as heat sources and heat sinks, are associated with a certain tolerance. This can make significantly more difficult a targeted thermal connection of a heat source of a battery system to a heat sink, since, for example, manufacturing-related imbalances, corrugations, different positions of connection points and the like can make more difficult a precise and desired adjusting of a heat-conducting material with respect to its thickness.

For example, distancing elements, also referred to as spacers, are also used for ensuring a minimum layer thickness with heat-conducting material for a sufficient electrical insulation; the spacers are, for example, embedded in the heat-conducting material. However, in particular if the heat-conducting material is also to have an adhesive function, this can have an adverse mechanical effect on a connection of a heat source to a heat sink. In addition, a minimum thickness with the heat-conducting material can be ensured by such distancing elements or spacers, but not a uniform layer thickness.

An electrical insulation can also be ensured, for example, by means of an additional protective film, but additional costs are thus incurred. The associated production expense is also correspondingly high. In addition, under certain circumstances a weak point in the case of a structural adhesion can appear due to such a measure. In addition, insulation measurements are often only performed on the finished battery system or on finished components of the battery system, whereby errors with respect to an insufficient electrical insulation or an unfavorable layer thickness with respect to the heat-conducting material can only be recognized in retrospect. Under certain circumstances required repairs are then expensive and sometimes also economically no longer expedient.

SUMMARY

This section provides a general summary of the disclosure and is not a comprehensive disclosure of its full scope or all of its features.

The present disclosure provides a thermal connection of a heat source of a battery system to a heat sink of the battery system can be effected in an optimal thermodynamic manner and also in a particularly simple manner.

Additionally, the present disclosure provides a method as well as by a system for thermal connection of a heat source of a battery system to a heat sink of a battery system having the features of the independent patent claims. Advantageous designs including advantageous and non-trivial further developments of the present disclosure are specified in the dependent claims.

In the disclosed method for thermal connection of a heat source of a battery system to a heat sink of a battery system, a placing process is carried out using a placing device, wherein a distance between an electrically conducting housing surface of the heat source and an electrically conducting heat-transmission surface that is a part of the heat sink or is adjacent to the heat sink, is reduced by compression of an electrically insulating heat-conducting material disposed therebetween. During the placing process, a capacitance measurement using a measuring device is continuously carried out between the housing surface and the heat-transmission surface. Based on the capacitance measurement, a layer thickness of the heat-conducting material is continuously monitored, and based on the capacitance measurement, the placing device is also controlled using a control device until a prescribed layer thickness of the heat-conducting material is obtained.

The heat source can comprise a battery cell and/or an electronic component, wherein the heat-transmission surface can be part of a cooling system or a component that is adjacent to the cooling system. The heat-transmission surface can thus be a direct component of the heat sink, or a component disposed between the actual heat sink and the housing surface, for example, in the form of a bulkhead wall or the like. The heat source can be, for example, a single battery cell or also a battery module that includes a plurality of battery cells connected to one another. The heat source can also be, for example, the most diverse electronic components, such as, for example, fuses, bus-bars, relays, and the like. The heat source can also be a whole subassembly that comprises one or more battery cells as well as a plurality of current-conducting components or electronic components.

It is desired in the disclosed method that during implementation of the placing process with the aid of the mentioned continuous measurement of capacitance between the housing surface and the heat-transmission surface, a monitoring takes place of a current layer thickness of the heat-conducting material between the housing surface and the heat-transmission surface. During the placing process, which can also be another joining process, the layer thickness of the heat-conducting material serving as a thermal interface layer is thus continuously determined by capacitive measurement between the substrates, i.e., the housing surface and the heat-transmission surface. The capacitance measurement can provide a measuring signal that represents the measured capacitance. Here the measured capacitance is representative of the layer thickness.

Based on this a control signal for the placing device can be generated, according to which this control signal controls the placing process, so that a prescribed layer thickness of the heat-conducting material can be ensured between the housing surface and the heat-transmission surface. In other words, the measuring signal can be processed, and the control signal can be generated using the measuring signal. A distance, determined at the end of the placing process, between the housing surface and the heat-transmission surface, and thus a layer thickness of the heat-conducting material, can thus be reliably and easily defined in a repeatable manner independently of the manufacturing tolerances of the battery system.

For example, we have discovered that, for manufacturing reasons, there are often relatively major areas of unevenness on the battery bases or cell bases. Such unevenness does not represent a problem for the disclosed method for defining the prescribed layer thickness of the heat-conducting material. Because due to the ongoing capacitance measurement, a continuous monitoring of the layer thickness of the heat-conducting material during the placing process is possible in a simple and reliable manner. Without further expensive measurements, the layer thickness of the heat-conducting material can thus be reliably monitored during the entire placing process. As soon as the prescribed layer thickness of the heat-conducting material is achieved, the placing process can be reliably stopped, and above all at the right time.

Using the disclosed method, layer thicknesses with respect to the heat-conducting material can thus be defined in a completely targeted and precise manner. Thermal and electrical properties—i.e., above all, the electrically insulating properties and heat-conducting properties of the heat-conducting material—can thereby be defined in a targeted manner. Thus, using the disclosed method, battery cells can be placed or inserted at an identical gap size in the entire battery system, independently of tolerances in a cell base or in a bulkhead wall, without respective bases of the battery cells having to be precisely measured locally here.

With the aid of the disclosed method, an overdosing with respect to the heat-conducting material can also be avoided, which is otherwise often used so as to compensate for tolerance-induced deviations with respect to respective gap volumes. Using the disclosed method, it is thus not only possible to precisely define a layer thickness of the heat-conducting material, but also to define the use of the heat-conducting material without overdosing. Due to the reduced material use with respect to the heat-conducting material, the weight of the entire battery system and costs associated therewith can decrease.

The insulation capacity of the compressed heat-conducting material, which serves as a thermal interface, can be ensured by specifying a defined minimum gap dimension, i.e., the prescribed layer thickness, without additional measures, such as, for example, the above-mentioned protective films, spacers, over dimensioning of the layer thickness, and the like.

For example, if the heat source is a battery cell, then using the disclosed method it is possible to produce the same thermal resistance to the respective heat sink in all battery cells of the battery system, and thus to provide a homogeneous temperature distribution with respect to all battery cells of the battery system. The aging of the battery cells can thereby be slowed since they have a very uniform temperature distribution. Of course, the disclosed method is not only limited to battery cells. Using the disclosed method, the most diverse heat sources of a battery system can be connected to the most diverse heat sinks of a battery system in the manner described.

One possible form of the present disclosure provides that the capacitance measurement is effected using a measurement of alternating voltage. A continuous or ongoing capacitance measurement is thereby possible during the placing process.

A further possible form of the present disclosure provides that the capacitance measurement is effected at a measurement frequency between 1 kHz and 100 kHz, in particular between 5 kHz and 20 kHz. The capacitance measurement can thus be effected at relatively high measurement frequencies, whereby a very fast controlling or regulating of the placing process is made possible. The capacitance measurement thus does not influence the speed of the placing process, since the measurement frequency can be sufficiently high that in comparison to a placing movement during the placing process, very many individual measurements can be performed in order to continuously monitor the layer thickness of the heat-conducting material.

An additional possible form of the present disclosure provides that the results of a plurality of individual capacitance measurements are averaged, and based thereon, a respective layer thickness of the heat-conducting material is determined. A particularly precise determining of the respective layer thickness of the heat-conducting material can thereby be obtained. Even if individual capacitance measurements should be somewhat distorted, it is possible to continuously determine the respective layer thickness of the heat-conducting material in a particularly precise manner by averaging of a plurality of capacitance measurements.

According to another possible form of the present disclosure, a measuring signal is continuously applied to the housing side and/or to the heat-transmission surface and evaluated for capacitance measurement. The measuring signal can be emitted, for example, directly during the placing from a gripper of a placing device used on a cell cup of a battery cell. Since the measuring signal is continuously applied to the housing side and/or to the heat-transmission surface of the placing partners or joining partners and evaluated for the capacitance measurement, the capacitance measurement and thus the monitoring of the placing process can be effected in a particularly precise manner.

An additional form of the present disclosure provides that a process monitoring is carried out to indicate any short circuit between the housing surface and the heat-transmission surface and/or to indicate any air inclusions in the heat-conducting material, based on the capacitance measuring during the placing process. If, for example, a short circuit occurs due to foreign particles in the heat-conducting material between the housing surface and the heat-transmission surface during the placing process, then based on the capacitance measurement, this flaw can be detected in a very simple and rapid manner. This is because in the case of a short circuit the capacitance measurement essentially fails since the capacitance then goes to zero. An occlusion of foreign particles in the heat-conducting material can thus be recognized. In addition, it is also possible to detect air occlusions in the heat-conducting material by means of the capacitance measurement. Because air has a completely different dielectric constant than the heat-conducting material, which has a corresponding impact on the capacitance measurement and is then detectable. The most diverse errors can thus be readily recognized in the course of the capacitance measurement during the placing process.

An additional form of the present disclosure provides that if an error is detected during the process monitoring, the placing process is interrupted, and if the heat-conducting material is not yet cured, the placing process is carried out again after remedying of the error. Thus, any error corrections can be carried out more or less directly, since based on the capacitance measurement certain errors can already be recognized during the placing process. Errors otherwise only perhaps recognized during a final testing of the battery system can thus already be recognized during the placing process and—if possible—also be remedied.

The disclosed system for connecting a heat source of a battery system to a heat sink of a battery system comprises a placing device that is designed to implement a placing process, wherein a distance between an electrically conducting housing surface of the heat source and an electrically conducting heat-transmission surface that is a part of the heat sink or is adjacent to the heat sink, is reduced by compression of an electrically insulating heat-conducting material disposed therebetween. Furthermore, the system comprises a measuring device that is designed to continuously implement a capacitance measurement between the housing surface and the heat-transmission surface during the placing process. In addition, the system comprises a control device that is configured to monitor a layer thickness of the heat-conducting material based on the capacitance measurement, and to control the placing device until a prescribed layer thickness of the heat-conducting material is obtained. Advantageous designs of the disclosed method are to be regarded as advantageous designs of the disclosed system and vice versa, wherein the system includes in particular a means for carrying out the method steps. The placing device can be, for example, a robot or also other devices that are suitable for implementing the mentioned placing process. The measuring device and the control device can be separate components or modules. Alternatively, the measuring device and the control device are formed integrally in a type of measuring and evaluation module.

Additional advantages, features, and details of the present disclosure are indicated in the following description of an exemplary form as well as with reference to the drawings. The features and feature combinations mentioned above in the description, as well as the features and feature combinations shown below in the FIGURE description and/or in the individual FIGURES can be used not only in the respective combination specified, but also in other combinations or individually without departing from the context of the invention.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawing, in which:

The FIGURE illustrates a schematic depiction of a system for thermal connection of a battery cell to a cooling plate by mediation of a heat-conducting material, according to the teachings of the present disclosure.

The drawing described herein is for illustration purposes only and is not intended to limit the scope of the present disclosure in any way.

DETAILED DESCRIPTION

The following description is merely exemplary in nature and is not intended to limit the present disclosure, application, or uses. It should be understood that throughout the drawing, corresponding reference numerals indicate like or corresponding parts and features.

A system 10 for thermal connecting of a battery cell 12 to a cooling plate 14 of a not otherwise depicted battery system is shown in a schematic view in the FIGURE. In the following explanation, the battery cell 12 and the cooling plate 14 represent only exemplary examples of possible heat sources or heat sinks in a battery system.

The system 10 comprises a placing device 16 in the form of a robot or the like, which is designed to implement a placing process using respective arms 18, wherein a distance between an electrically conducting housing surface 20 of the battery cell 12 and an electrically conducting heat-transmission surface 22 of the cooling plate 14 serving as heat sink is reduced by compression of an electrically insulating heat-conducting material 24 disposed therebetween. For this purpose, the placing device 16 with its arms 18 can grip the battery cell 12 and move toward the cooling plate 14. Meanwhile, the heat-conducting material 24 disposed between the housing surface 20 and the heat-transmission surface 22 is compressed. The heat-conducting material 24 previously applied to the housing surface 20 and/or to the heat-transmission surface 22.

The system 10 also comprises a measuring device 26 that is connected to the battery cell 12 and to the cooling plate 14 by means of lines 28. The measuring device 26 is designed to continuously implement a measurement of the capacitance between the housing surface 20 and the heat-transmission surface 22 during the placing process. For example, the measuring device 26 may include one or more sensor circuits configured to measure capacitance. Finally, the system 10 also comprises a control device 30 for signal transmission that is connected via a line 32 to the placing device 16. Based on the capacitance measurement, the control device 30 is configured to monitor a respective current layer thickness of the heat-conducting material 24 during the placing process, and to control the placing device 16 until a prescribed layer thickness of the heat-conducting material 24 is obtained.

Thus, while the placing process is carried out, wherein a distance between the electrically conducting housing surface 20 of the battery cell 12 and the electrically conducting heat-transmission surface 22 of the cooling plate 14 is reduced by compressing of the electrically insulating heat-conducting material 24 disposed therebetween, the measuring device 26 continuously implements the mentioned capacitance measurement. The capacitance measurement is effected here using an alternating-voltage measurement. Here a measurement frequency can be used between 1 kHz and 100 kHz, in particular between 5 kHz and 20 kHz. During the capacitance measurement, a measuring signal is continuously applied via the lines 28 to the housing surface 20 and/or to the heat-transmission surface 22 and evaluated for capacitance measurement. In particular, the results of a plurality of individual capacitance measurements can be averaged, wherein based on this average a respective current layer thickness of the heat-conducting material 24 is then determined.

The measuring device 26 continuously relays corresponding results of the capacitance measurements to the control device 30. Based on the ongoing capacitance measurement or based on the results of the ongoing capacitance measurement, the control device 30 generates corresponding control signals for controlling the placing device 16. In the simplest case, the control device 30 simply transmits a stop signal to the placing device 16 via the line 32 as soon as it is determined in the course of the capacitance measurement that the prescribed layer thickness the heat-conducting material 24 has been achieved. It would also be possible, for example, to slow down the placing movement—i.e., the movement of the battery cell 12 toward the cooling plate 14—with ever-smaller thickness of the heat-conducting material 24. The placing movement is also controlled in a manner adapted to the mechanical load capacity of the battery cell 12 and the cooling plate 14.

In addition, the measuring device 26 and/or the control device 30 is configured to implement a process monitoring based on the capacitance measurement during the placing process. In one form, the capacitance measurement is used to detect short circuits between the housing surface 20 and the heat-transmission surface 22, which can be caused, for example, by foreign particles in the heat-conducting material 24.

In addition, in one form, it is also possible to detect air occlusions are detected in the heat-conducting material 24 based on the capacitance measurement. If an error is detected in the course of process monitoring, the placing process can be interrupted. If the heat-conducting material 24 is then not yet cured, the placing process, for example, can be implemented again after remedying of the respective error—if possible. Errors that can otherwise possibly only be detected with difficulty or at a later time—which errors may occur in the course of a placing process—can thus be readily detected during the placing process by a type of online process monitoring due to the capacitance measurement. Thus, it is possible, for example, to define not only the gap thickness between the battery cell 12 and the cooling plate 14, and thus the layer thickness of the heat-conducting material 24, but in addition it is also possible to detect the most diverse errors using the capacitance measurement during the placing process and optionally also to correct them directly.

As mentioned above, the battery cell 12 and the cooling plate 14 are to be understood as merely representative and exemplary for possible heat sources or heat sinks of a battery system. In principle, the explained system 10 and explained method can be used for thermal connection of the most diverse heat sources of a battery system to the most diverse heat sinks of a battery system.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "control device", "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for thermal connection of a heat source of a battery system to a heat sink of the battery system, the method comprising:
    implementing a placing process using a placing device, wherein a distance between an electrically conducting housing surface of the heat source and an electrically conducting heat-transmission surface that is a part of the heat sink or is adjacent to the heat sink is reduced by compression of an electrically insulating heat-conducting material disposed therebetween;
    using a measuring device to implement a continuous measurement of capacitance between the housing surface and the heat-transmission surface during the placing process; and,
    monitoring of a layer thickness of the heat-conducting material and controlling of the placing device using a control device until a prescribed layer thickness of the heat-conducting material is attained based on the capacitance measurement.

2. The method according to claim 1, wherein the capacitance measuring takes place at a measuring frequency between 1 kHz and 100 kHz.

3. The method according to claim 2, wherein the capacitance measuring takes place at a measuring frequency between 5 kHz and 20 kHz.

4. The method according to claim 1, wherein based on a capacitance measurement during the placing process, a process monitoring is carried out to indicate any short circuit between the housing surface and the heat-transmission surface and/or to indicate any air inclusions in the heat-conducting material.

5. The method according to claim 4, wherein if an error is detected during the process monitoring, the placing process is interrupted, and if the heat-conducting material is not yet cured, the placing process is carried out again after remedying of the error.

6. The method according to claim 1, wherein the heat source comprises a battery cell and/or an electronic component, wherein the heat sink is part of a cooling system of the battery system.

7. The method according to claim 1, wherein the capacitance measurement is effected using an alternating-voltage measurement.

8. The method according to claim 1, wherein results of a plurality of individual capacitance measurements are averaged, and based thereon, a respective layer thickness of the heat-conducting material is determined.

9. The method according to claim 1, wherein during a capacitance measurement a measuring signal is continuously applied to at least one of a housing side and the heat-transmission surface and evaluated for capacitance measurement.

10. A system for thermal connection of a heat source of a battery system to a heat sink of a battery system, the system comprising
a placing device configured to carry out a placing process, wherein a distance between an electrically conducting housing surface of the heat source and an electrically conducting heat-transmission surface that is part of the heat sink or is adjacent to the heat sink is reduced by compression of an electrically insulating heat-conducting material disposed therebetween;
a measuring device configured to continuously carry out a measurement of capacitance between the housing surface and the heat-transmission surface during the placing process; and
a control device configured to monitor a layer thickness of the heat-conducting material based on a capacitance measurement, and to control the placing device until a prescribed layer thickness of the heat-conducting material is attained.

* * * * *